United States Patent [19]
Guerrina

[11] Patent Number: 6,121,567
[45] Date of Patent: Sep. 19, 2000

[54] APPARATUS AND METHOD FOR PRECISELY ALIGNING AND WELDING TWO PIECES OF WELDABLE MATERIAL

[76] Inventor: Michael Guerrina, 720 Bastrop Hwy., Suite 103, Austin, Tex. 78741

[21] Appl. No.: 08/878,394

[22] Filed: Jun. 18, 1997

Related U.S. Application Data

[63] Continuation-in-part of application No. 08/318,385, Oct. 5, 1994, Pat. No. 5,679,271.
[51] Int. Cl.[7] .................................................. B23K 9/00
[52] U.S. Cl. ...................... 219/61; 219/60 A; 219/125.11
[58] Field of Search ................................ 219/61, 60 A, 219/125.11

[56] References Cited

U.S. PATENT DOCUMENTS

| | | | |
|---|---|---|---|
| 3,194,936 | 7/1965 | Rohrberg et al. | 219/60 A |
| 3,350,534 | 10/1967 | Libby | 219/125.11 |
| 3,636,294 | 1/1972 | Peyrot | 219/60 A |
| 3,688,072 | 8/1972 | Witt | 219/60 A |
| 3,870,849 | 3/1975 | Rygiol | 219/60 A |
| 5,288,963 | 2/1994 | Jusionis | 219/60 A |

*Primary Examiner*—Clifford C. Shaw
*Attorney, Agent, or Firm*—David G. Henry

[57] ABSTRACT

Applicant's invention includes an apparatus and associated method for precisely aligning two pieces of weldable material and welding the two pieces, the apparatus contains means for independently securing the two pieces of weldable material and for centering the junction of the two pieces in line with the welding electrodes.

16 Claims, 8 Drawing Sheets

APPARATUS AND METHOD FOR PRECISELY ALIGNING AND WELDING TWO PIECES OF WELDABLE MATERIAL

BACKGROUND OF THE INVENTION

This patent application is a continuation-in-part application of application Ser. No. 08/318,385, Filed Oct. 5, 1994 now U.S. Pat. No. 5,679,271.

1. Field of the Invention

Applicant's invention relates to the joining together of two pieces of material by welding.

2. Background Information

Welding is a well-known and widely-used method used to permanently join together two pieces of metal tubing or other weldable material. To accomplish a weld of high integrity, the two pieces to be joined together must be properly aligned.

Misalignment during welding creates discontinuities at the abutment junction of the two pieces of weldable material that can serve as havens for particle impurities. The existence of these particle "sites" is intolerable when the welding is being performed in connection with ultra-pure applications such as are common in the semiconductor industry.

Moreover, misalignment can result in a leaky junction that destroys the purity of the substance flowing through the tubing and creates a potentially dangerous external environment if the substance flowing through the tubing is toxic. Thus, it is highly desirable to minimize tube misalignment when welding.

Maintaining proper alignment during the conventional welding process, however, is a time-consuming and difficult task. The pieces of weldable material to be aligned and welded must be clamped tightly in alignment before and during the welding process, or the pieces will tend to slip out of alignment before the weld is completed.

Conventional orbital weld heads do not solve this slippage problem. In an orbital welding machine, a computer-controlled welding machine works in conjunction with a weld head that also holds the two pieces of weldable material together during the welding process. The weld head is essentially comprised of a system of gears and an electrode for making the weld. The gears control the movement of the electrode as it "orbits" around the circumference of the junction between the two pieces of weldable material. Orbital welding is in great demand, especially for welding of tubing of smaller circumference, because of the ease in which the welding process can be controlled. Orbital welding however, does not solve the problem of misalignment.

To the contrary, the conventional weld head on a standard orbital welder has such little clamping surface area that proper alignment of the pieces of weldable material is often the most significant and time-consuming challenge facing the technician operating the welder. For example, welding is often performed on pieces of weldable material that are many feet in length and that may have hardware are other accessories permanently attached thereto. Because the weld head in conventional welding is typically affixed to a table or bench, the technician is sometimes required to place one end of a weldable material piece upon support blocks so that the weight of the weldable material and any attached hardware does not drag the weldable material out of alignment.

In addition, because of the construction of the conventional orbital weld head, the technician has an extremely limited view of the junction to be welded as he attempts to align the two pieces of weldable material to each other and position the junction of the two pieces in line with the electrode. To aid in the alignment procedure, the technician may use a "feeler" gauge such as a small screwdriver. The feeler gauge is moved by the technician over the top or side of the abutment junction, allowing the technician to determine which of the two pieces of weldable material needs to be moved to improve the alignment. Even after achieving acceptable alignment of the pieces to be welded together, the technician is also required to position the tube junction to be welded in line with the electrode, to ensure a proper weld. The manual performance of these tasks is far from ideal for applications requiring strict alignment and is very time-consuming.

Even if the technician is able to obtain satisfactory alignment at the start of the conventional orbital welding process, the weldable material pieces will tend to separate during the welding process, because hot spots created by the rotating electrode expand to different degrees, thereby creating a twisting effect as the electrode continues its rotation around the abutment junction. An attempt to excessively tighten the clamps on the weld head to overcome this problem usually results in the formation of clamping marks in the weldable material and may result in actual tube deformation.

In an attempt to solve the problem of alignment and the "twisting effect" described above, skilled welders commonly align the two pieces of weldable material and make several temporary spot welds or "tack" welds around the circumference of the abatement junction prior to final welding. Tack welds join the two pieces of weldable material together and are sufficiently strong to prevent the separation and twisting effect described above. During final welding, the tack welds merely are re-melted into the final weld.

Even when using tack welding, proper alignment is critical, and therefore, tack welding, by itself, does not address the problem of creating acceptable alignment in a time efficient manner. Although tack welding effectively joins two pieces together prior to performing an orbital weld and makes the orbital welding process much simpler, throughput or productivity, measured in welds per hour, is still limited by the amount of time it takes to align the pieces in preparation for the tack weld.

Applicant's prior invention, which is the subject of patent application Ser. No. 08/318,385, has addressed this alignment problem by teaching the use of a device which allows two pieces of weldable material to be precisely aligned and tack welded together. Although Applicant's prior invention is a definite improvement over the prior art, it still is not an ideal solution, because once the tack weld is completed, the technician must then spend time switching instruments to perform a full weld with a conventional orbital weld head.

The present invention expands and improves upon the concept taught by Applicant's prior invention, by teaching the use of a device that causes two pieces of weldable material to be precisely aligned and completely welded together, thereby eliminating the steps of tack welding and then switching instruments to perform a complete weld.

Thus, the present invention, by mechanizing the aligning task, has all of the benefits of a conventional orbital welder, but greatly reduces the time required to achieve tolerable alignment and eliminates the separation, twisting, and clamp mark problems associated with the use of a conventional orbital welder.

SUMMARY OF INVENTION

It is an objective of this invention to provide a device and method of operation for said device for aligning and welding together two pieces of weldable material.

BRIEF DESCRIPTION OF THE PREFERRED EMBODIMENT

DETAILED DESCRIPTION OF THE PREFERRED EMBODIMENT

Figure 1:
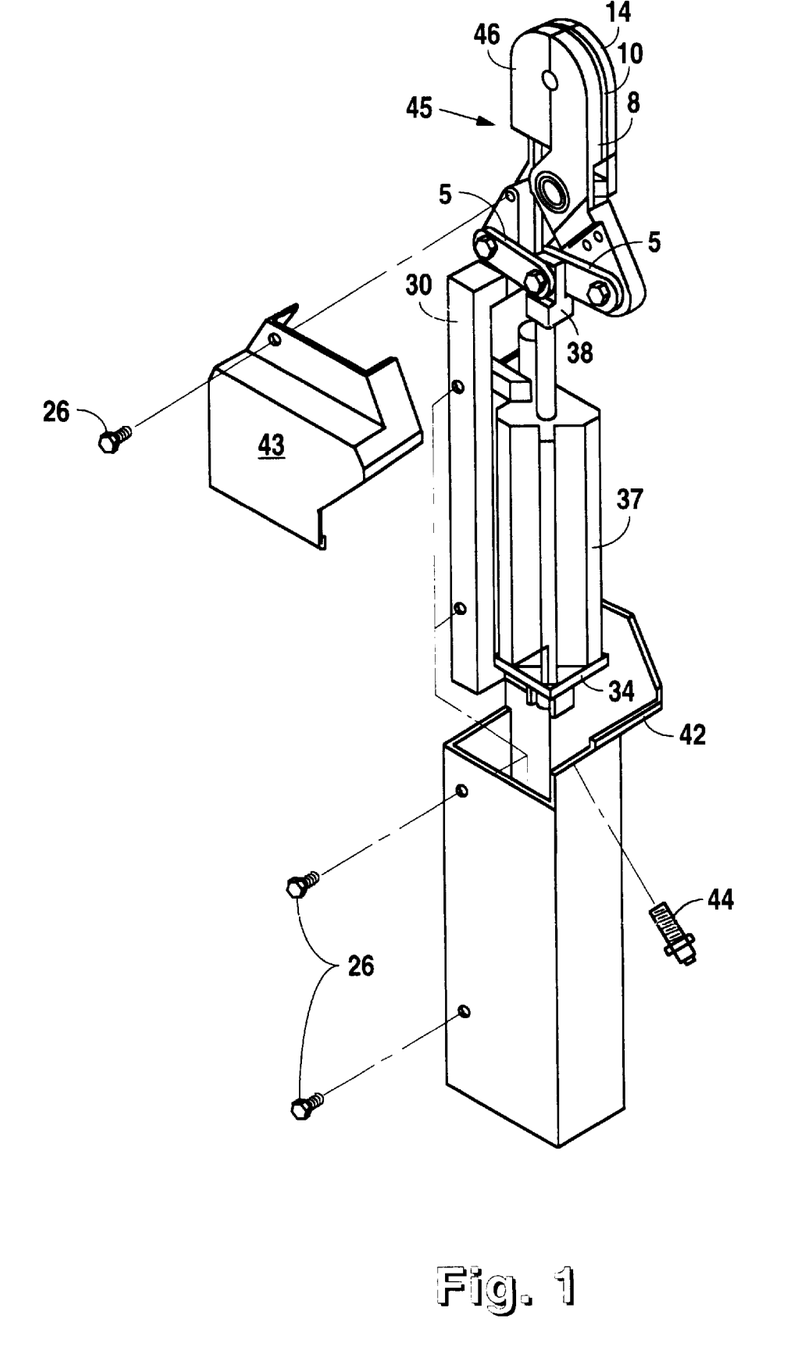
FIG. 1 is a perspective view of the alignment/welding device in the closed position.
Figures 3, 4:
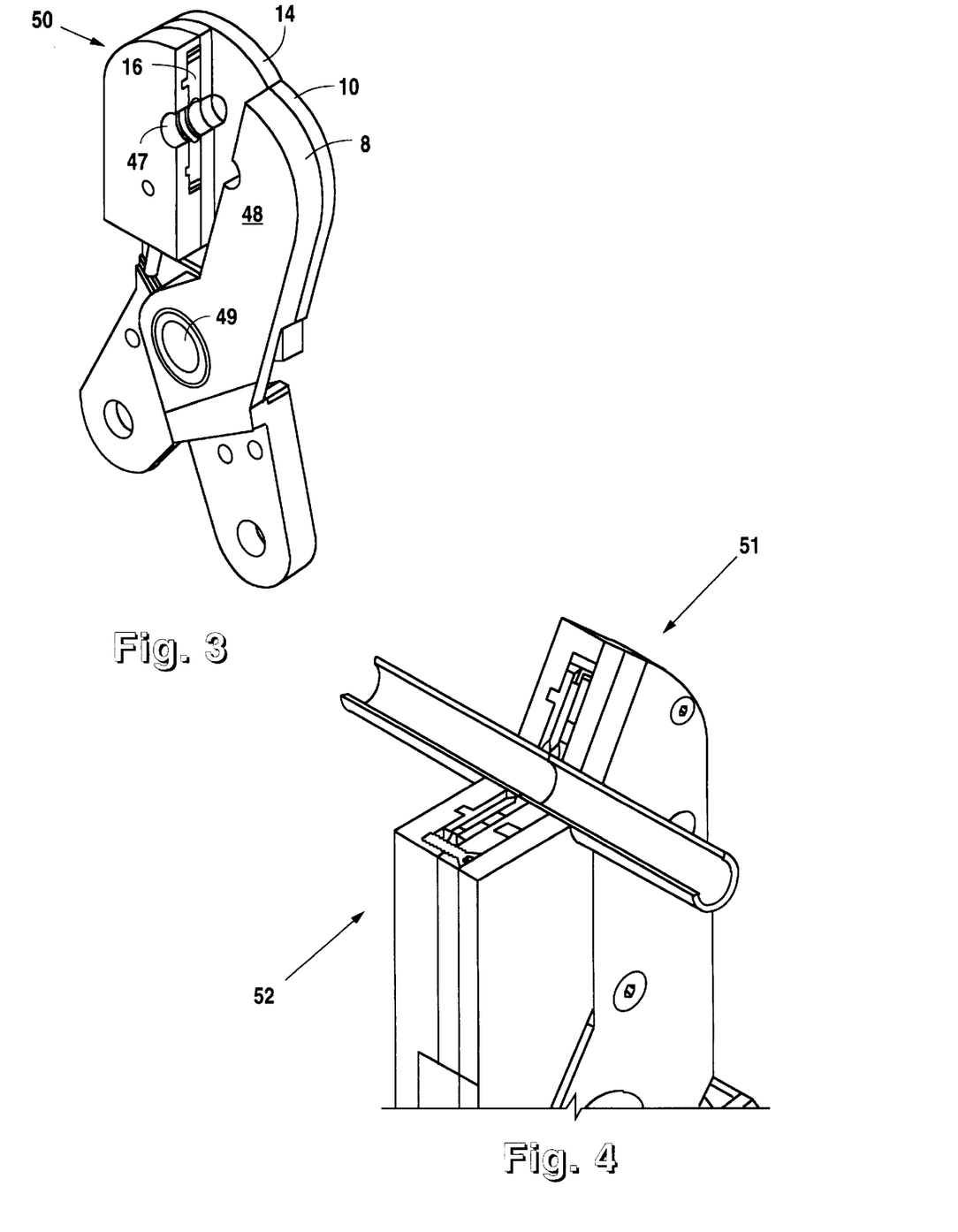
FIG. 3 is a perspective view of the alignment/welding device showing the device being closed from a fully open position to a partially closed first position, wherein the pre-lock clamping jaw rests against the first jaw.
FIG. 4 is a partial cut-away view of a portion of the alignment/welding device in the closed position with welding material present.

Referring to FIG. 1 and FIG. 3, alignment/welding device 45 preferably has a first jaw 46, a second jaw 08 and a pre-lock clamping jaw 15. The first jaw 46 has a substantially semi-cylindrical gap which forms a first alignment zone 47. The second jaw 08 also has a substantially semi-cylindrical gap which forms a second alignment zone 48. The pre-lock clamping jaw 15 also has a substantially semi-cylindrical gap which forms a third alignment zone 50.

The first jaw 46 and second jaw 08 are pivotally joined together in a conventional pivot fashion, as commonly found in pliers or other similar hand tools, by using a pivot pin, bolt or similar component 49. The pre-lock clamping jaw 15 is mounted on the pivot pin 49 alongside the second jaw 08. As illustrated in FIG. 3 and as discussed below, when pivotally joined together and placed in the partially closed first position, the first jaw 46 aligns with and abuts against the pre-lock clamping jaw 15, in such a manner that the first alignment zone 47, and the third alignment zone 50 form a substantially cylindrical first section of an alignment conduit.

When the device is place in the fully closed second position, the first jaw 46 also is aligned with and abuts against the second jaw in such a manner that the first alignment zone 47 and the second alignment zone 48 form a substantially cylindrical second section of the alignment conduit which is substantially the same diameter as and contiguous with, the first section of the alignment conduit.

The diameter of the first section and second section of the alignment conduit preferably are substantially equal to the diameter of the pieces of weldable material to be welded together.

Figure 2:
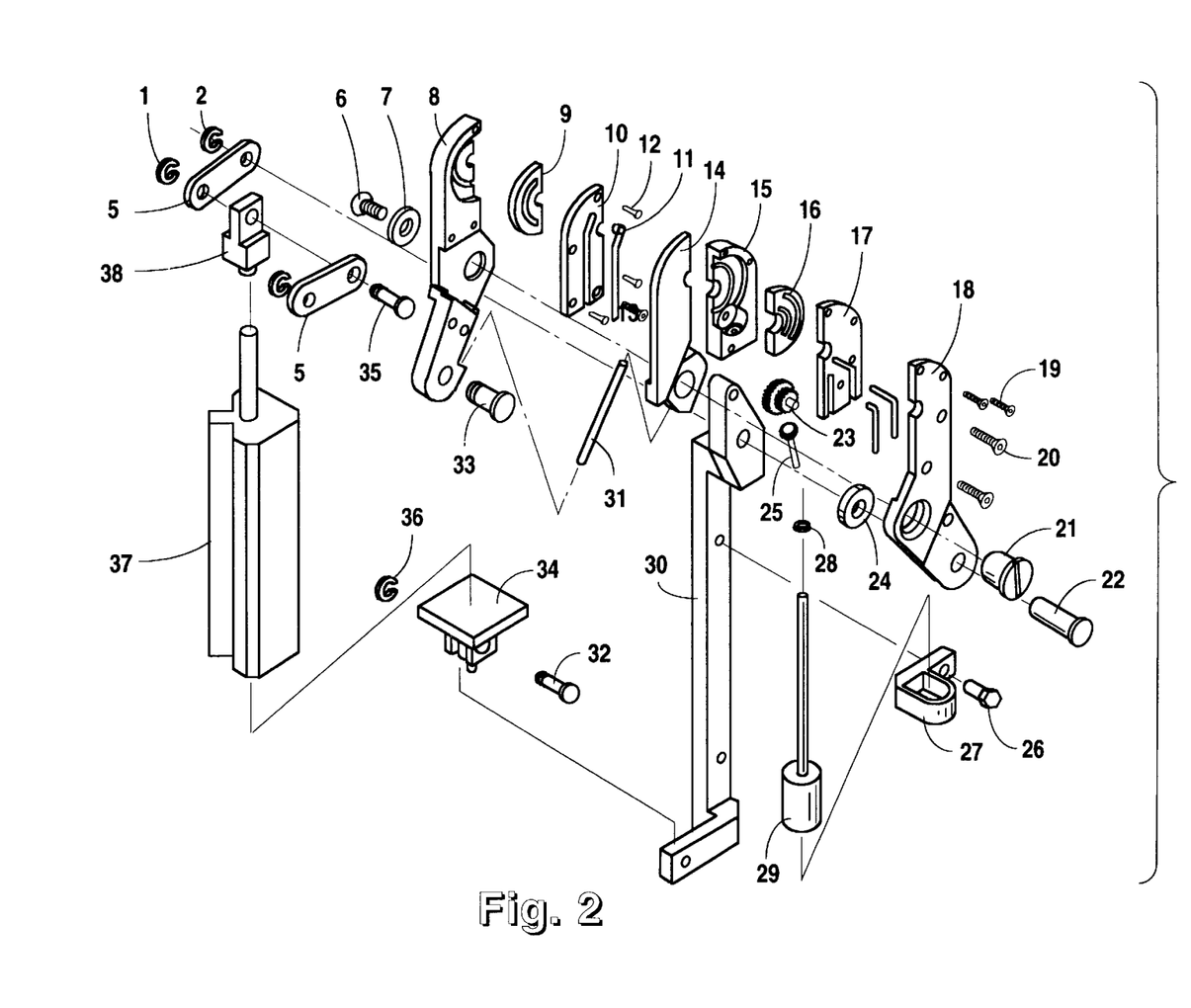
FIG. 2 is an exploded view showing the arrangement of the various components that comprise the preferred embodiment of the alignment/welding device.

Referring to FIG. 2, tension rod 31 connects the pre-lock clamping jaw 14 to the second jaw 08 and pivotally advances pre-lock clamping jaw 14 so that the pre-lock clamping jaw 14 leads the second jaw 08 when the device is being closed, as shown in FIG. 3. The device 45 is closed to a first position by actuating a double acting/single rod pneumatic cylinder 37 (FIG. 2) or similar device. In place of a pneumatic cylinder, other well-known methods for closing the device can be used, such as a ratcheting gear or even manual pressure applied by the technician.

In this partially-closed first position, the pre-lock clamping jaw 14 abuts against the first jaw 46 as illustrated in FIG. 3 and the first section of the alignment conduit is formed. As device 45 is fully closed to the second/final position, the second jaw also abuts against the first jaw and the second section of the alignment conduit is formed. In the fully closed second position, the second jaw 8 and the pre-lock clamping jaw 14 are firmly positioned against the first jaw 46.

This mechanism allows a first piece of weldable material 51 and a second weldable material piece 52 to be secured into device 45 independently of one another.

Figure 6:
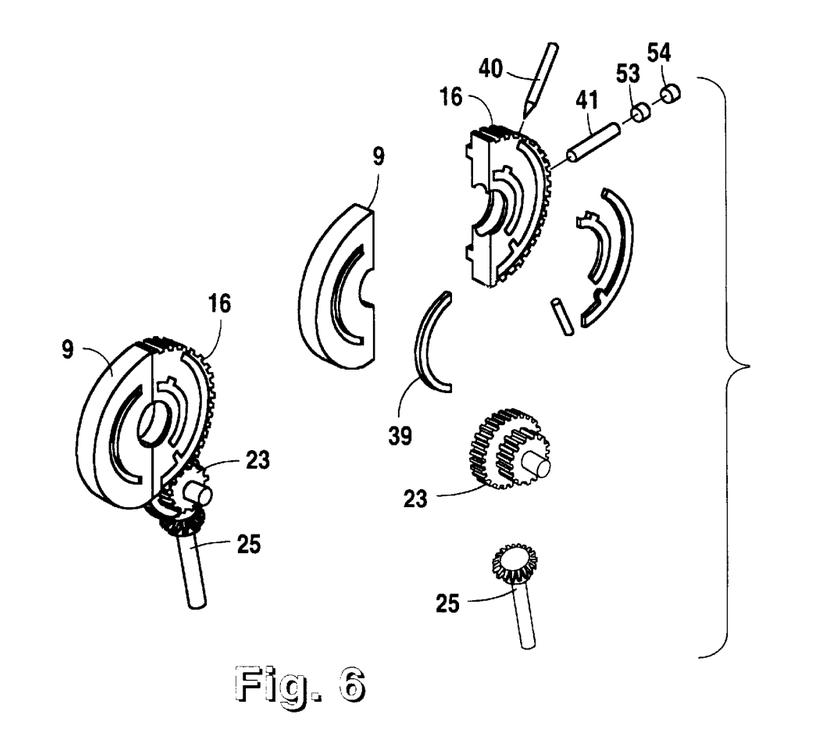
FIG. 6 is an exploded view of the electrode/rotating gear assembly of the alignment/welding service.
Figure 9:
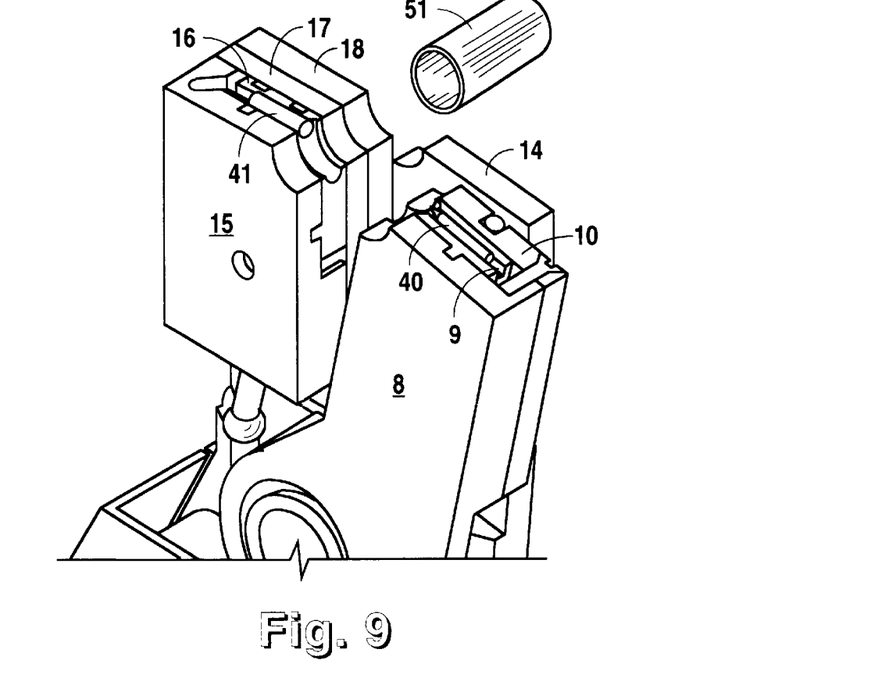
FIG. 9 is a cross-sectional view of the top portion of the alignment/welding device that holds the weldable pieces of material when such alignment/welding device is in the fully open position.

The manner in which the device 45 is used to align and weld two pieces of weldable material is best demonstrated by referring to FIGS. 9–12. As illustrated in FIG. 9, the technician places the first piece of weldable material 51 between the first jaw 46 and pre-lock clamping jaw 14, abutting against the retractable centering pin 41, located in the first jaw. As shown in FIG. 6, the centering pin is preferably spring-loaded and adjusted with a set screw. The centering pin is positioned such that it extends into the alignment conduit and is in the same plane of spatial orientation as the plurality of electrodes which also extend into the alignment conduit 40. The purpose of the centering pin is to center the abutment junction of the two pieces of weldable material directly in line with the electrodes and, therefore, any mechanism that would serve this purpose, would suffice.

Figure 10:
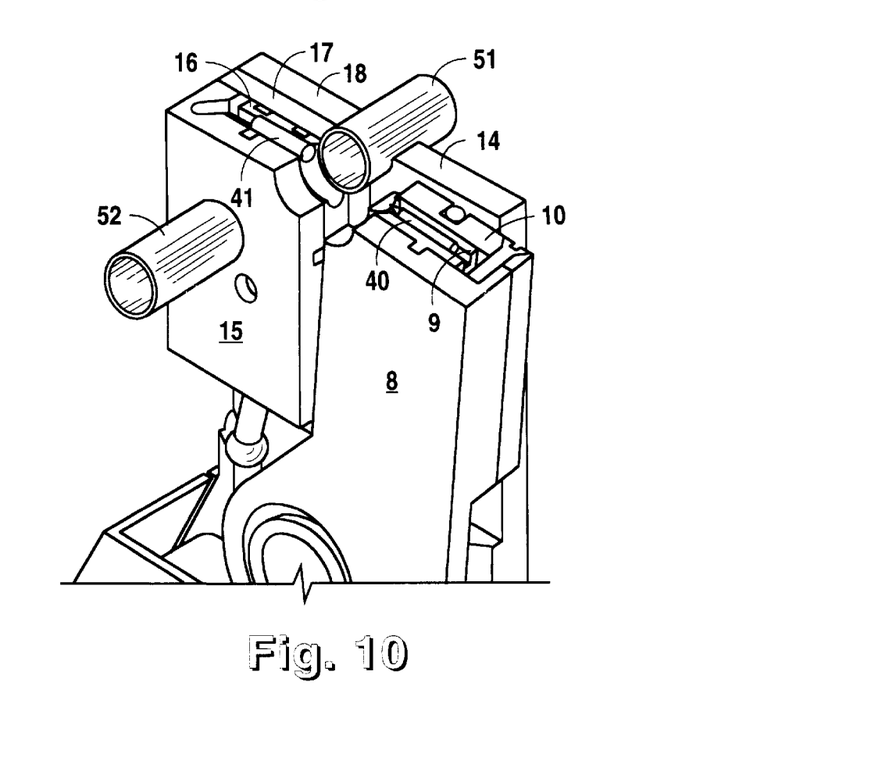
FIG. 10 is a cross-sectional view of the top portion of the alignment/welding device that holds the weldable pieces of material, when the first piece of weldable material has been inserted into the alignment/welding device and the alignment/welding device is closed to a partially closed first position, securely clamping the first piece of weldable material.
Figure 11:
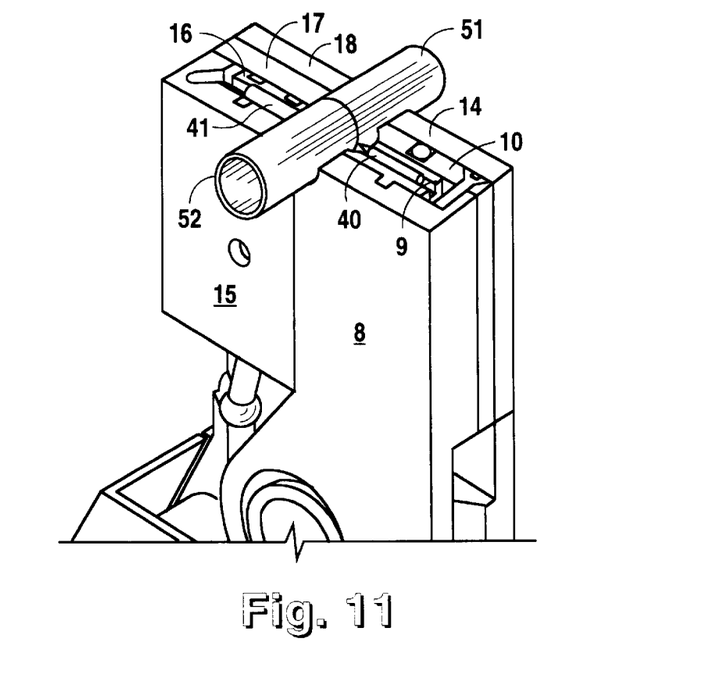
FIG. 11 is a cross-sectional view of a portion of the alignment/welding device that holds the weldable pieces of material, when the second piece of weldable material has been inserted into the alignment/welding device to abut against the first piece of weldable material, and the alignment/welding device is closed to a fully closed, second position, securely clamping the second piece of weldable material.

As illustrated in FIG. 10, as the device 45 is closed to the partially-closed first position, the pre-lock clamping jaw 14 makes contact with the first jaw 46, thereby firmly securing the first weldable material piece 51 in the first section of the alignment conduit, with the first terminus of the first piece of weldable material being located in the same plane of spatial orientation as the electrodes 40. As illustrated in FIG. 10 and FIG. 11, the technician then places the second piece of weldable material 52 between the first jaw 46 and second jaw 08, with the terminus of said second piece abutting the first terminus of the first weldable material piece 51. This action will cause the centering pin 41 to be depressed. In this manner, the two pieces of weldable material will contact each other and form an abutment junction in substantially the same plane of spatial orientation as the electrodes 40 surrounding the alignment conduit. By actuating the pneumatic cylinder 37 to the second/final position, the second jaw 08 contacts the first jaw 46 and firmly secures the second piece of weldable material 52 within the second alignment conduit.

Figure 5:
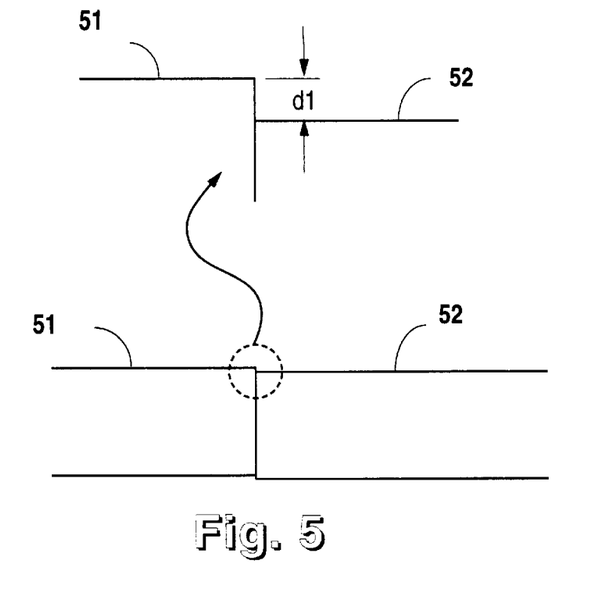
FIG. 5 is a depiction of the distance "d1" which is used to measure alignment tolerances.

Because the first section and second section of the alignment conduit are substantially the same diameter and are substantially contiguous when device 45 is in the fully closed position, the first weldable material piece 51 and the second weldable material piece 52 will be in strict alignment with each other. Alignment tolerances of 10% or better can be achieved by the device 45 where the alignment tolerance equals the distance by which the weldable material pieces deviate from perfect alignment, divided by the diameter of the weldable material pieces. The distance by which the weldable material pieces deviate from perfect alignment is shown as "d1" in FIG. 5 and is measured at the largest exposed edge of first weldable material piece 51 at the junction with second weldable material piece 52.

When the device 45 is in a fully closed position, the first weldable material piece 51 and the second weldable material piece 52 are in place and the junction of these two pieces are in substantially the same plane of spatial orientation as the electrodes 40. Furthermore, the first weldable material piece 51 and the second weldable material piece 52 are in alignment with each other. With the first weldable material piece 51 and the second weldable material piece 52 thus securely clamped into place, device 45 can now be used for the weld process.

Figure 7:
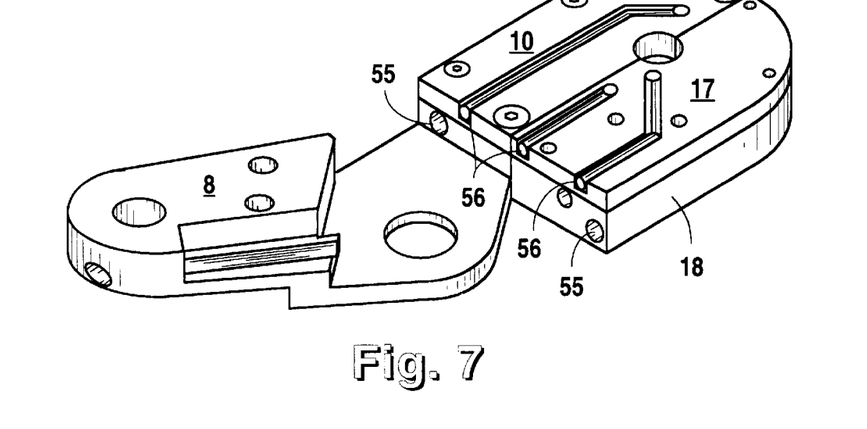
FIG. 7 is a perspective view of a portion of the alignment/welding device, illustrating the manner in which the electrodes are wired.
Figure 8:
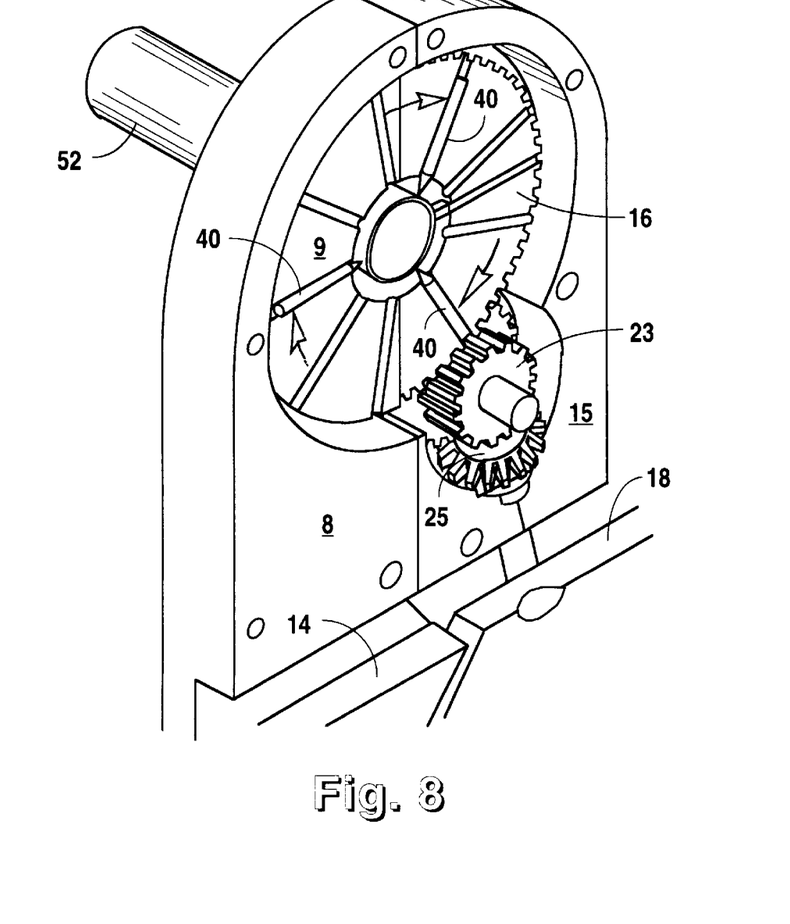
FIG. 8 is a cut-away view of a portion of the alignment/welding device with a piece of weldable material in place, illustrating the manner in which the rotating gear assembly is arranged.
Figure 12:
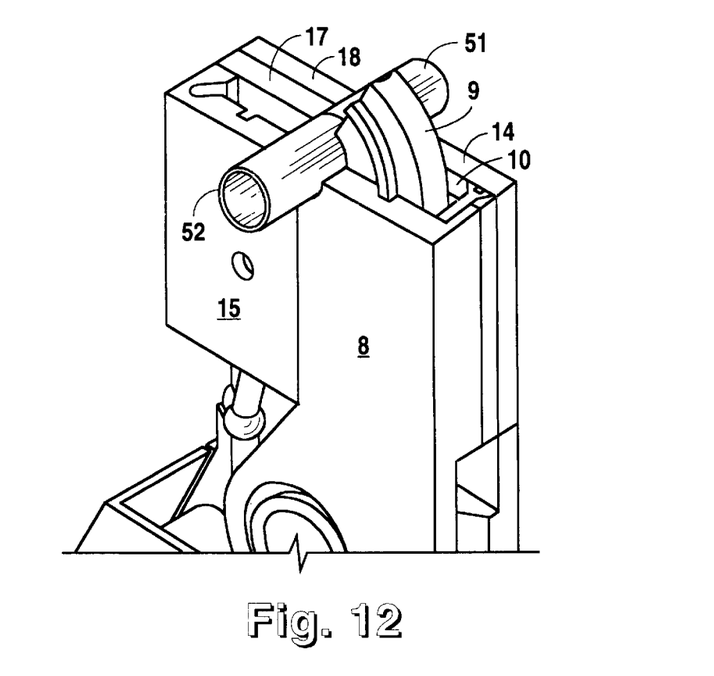
FIG. 12 is a cross-sectional view of a portion of the alignment/welding device that holds the weldable pieces of material, after the two pieces of weldable material are securely clamped in place and the rotating gear assembly begins rotating the arcing electrodes around the abutment junction of the two pieces of weldable material, thereby welding the junction.

Referring to FIG. 7, argon gas from an external source (not shown) will flow into purge lines 55 via an external hose (not shown). The weld process is then initiated by depressing switch 44 which is depicted in FIG. 1. Referring to FIG. 6 and FIG. 8, the external welder (not shown) will supply an electric charge via wires 56 (FIG. 7) to the contacts 39 which will then cause electrodes 40 to arc to the abutment junction, thereby beginning the weld. An electric motor 29 or similar device then rotates u-joint 28, which, in turn, rotates the primary drive gear 25. As shown in FIG. 6 and FIG. 8, the primary drive gear 25 then rotates the secondary drive gear 23, thereby rotating insulating gears 09 and 16 a total of approximately 130 degrees. As illustrated in FIG. 12, the rotation of the insulating gears 09 and 16 allows the electrodes 40 to revolve around the abutment junction, thereby creating a complete weld of the abutment junction.

Figure 13:
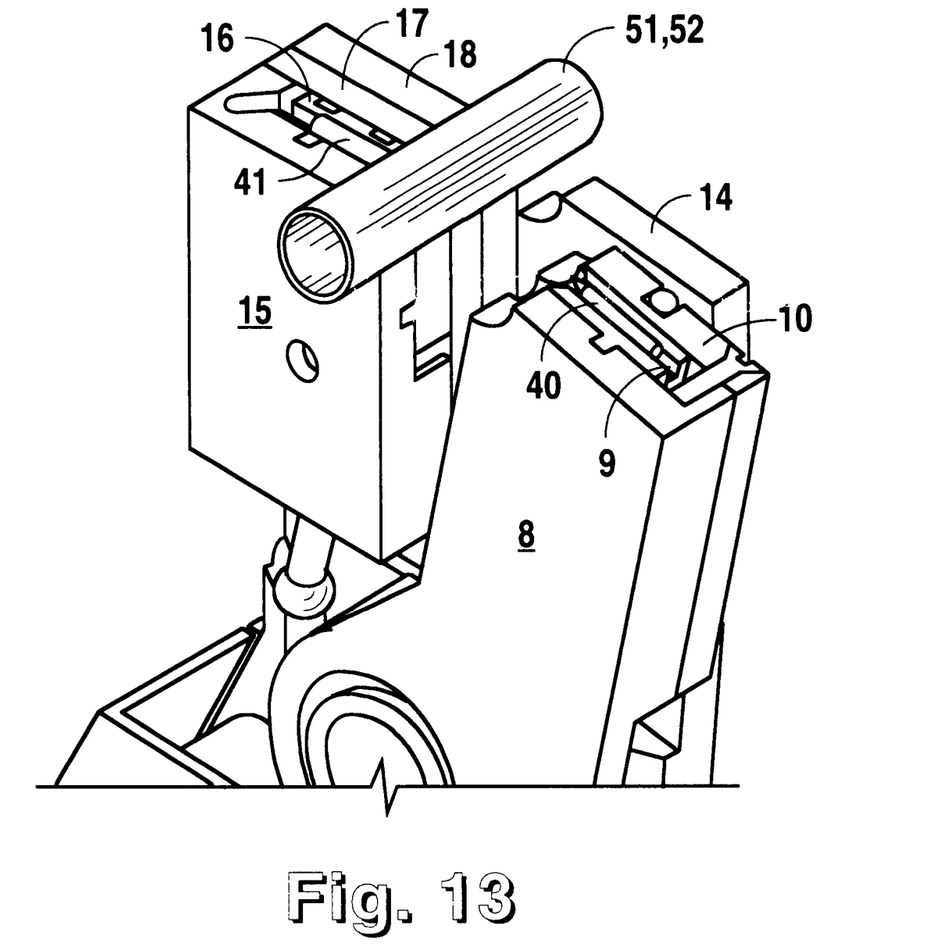
FIG. 13 is a cross-sectional view of a portion of the alignment/welding service that holds the weldable pieces of material, after the two pieces of weldable material have been welded together at the abutment junction and the alignment/welding device has been returned to a fully open position.

After the weld process is over, pressure is applied to the return side of the pneumatic cylinder 37 (FIG. 1), thereby releasing the pre-lock clamping jaw 14 and second jaw and allowing the fused weldable material piece to be removed from the device 45 as illustrated in FIG. 13.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. An apparatus for precisely aligning and welding a first piece of weldable material to a second piece of weldable material, comprising:

a high precision alignment device, comprising clamping means sized and shaped for receiving and removably clamping a first terminus of said first piece of weldable material in a first plane of spatial orientation and sized and shaped for receiving, removably clamping and aligning a first terminus of said second piece of weldable material in said first plane of spatial orientation in such a manner that said first terminus of said second piece of weldable material is substantially in alignment with and substantially abuts against said first terminus of said first piece of weldable material to form an abutment junction when said first terminus of said second piece of weldable material and said first terminus of said first piece of weldable material are fully inserted into said alignment device;

orbital welding means attached to said high precision alignment device and positioned for applying a weld to said abutment junction as said orbital welding means orbits said abutment junction;

a first jaw, having a first end, a second end, first alignment zone, having a first section and a second section inside surface that define an alignment gap;

a second jaw, having a first end, a second end, and a second alignment zone having an inside surface that defines a second alignment gap;

a pre-lock clamping jaw having a first end, a second end and a third alignment zone having an inner surface that defines a third alignment gap, said third alignment gap being of substantially the same dimensions as said second alignment gap; said pre-lock clamping jaw being pivotably attached and oriented to said first jaw in such a manner that said inside surface of said third alignment zone and said first section inside surface of said first alignment zone cooperatively define a first section of an alignment conduit that is sized and shaped to snugly encircle and firmly secure said first terminus of said first piece of weldable material when said first end of said first jaw is at a first separation distance from said first end of said second jaw; said second jaw being pivotably attached to said first jaw and being oriented to said first jaw in such a manner that said second section inside surface of said first alignment zone and said inside surface said second alignment zone cooperatively define a second section of said alignment conduit that is at least partially contiguous with said first section of said alignment conduit and that is sized and shaped to snugly encircle and firmly secure said first terminus of said second piece of weldable material when said first end of said first jaw is at a second, closer separation distance from said first end of said second jaw.

2. The apparatus of claim 1 wherein said welding means comprises a plurality of electrodes that extend into said alignment conduit.

3. The apparatus of claim 2 further comprising centering means for placing said abutment junction in close proximity to said electrodes.

4. The apparatus of claim 3 wherein said centering means comprises a centering pin retractably mounted to said alignment device and extending into said alignment conduit, said centering pin being positioned to blockingly engage said first terminus of said first piece of weldable material when said first end of said first jaw is at said first separation distance from said first end of said second jaw and said first terminus of said first piece of weldable material is fully inserted into said alignment device; said centering pin further being positioned to retract when said first terminus of said second piece of weldable material is fully inserted into said alignment device and abuts against said first terminus of said first piece of weldable material.

5. The apparatus of claim 4 wherein said first terminus of said first piece of weldable material and said first terminus of said second piece of weldable material to be inserted in said precision alignment device are substantially cylindrically tubular; wherein the outside diameter of said first terminus of said first piece of weldable material is substantially equal to the outside diameter of said first terminus of said second piece of weldable material; and wherein the alignment tolerance at said abutment junction is less than to equal to 10%.

6. The apparatus of claim 5, further comprising rotating gear means attached to said electrodes for operationally causing said electrodes to orbit said abutment junction.

7. The apparatus of claim 6, further comprising closure means for moving said first end of said second jaw from said first separation distance from said first end of said first jaw to said second separation distance from said first jaw.

8. The apparatus of claim 7, wherein said closure means comprises a pneumatic cylinder.

9. A method of simultaneously aligning and welding two pieces of weldable material comprising the steps of:
Selecting two pieces of weldable material;
Selecting an appropriate aligning/welding apparatus, wherein said apparatus comprises:
a high precision alignment device, comprising clamping means sized and shaped for receiving and removably clamping a first terminus of said first piece of weldable material in a first plane of spatial orientation and sized and shaped for receiving, removably clamping and aligning a first terminus of said second piece of weldable material in said first plane of spatial orientation in such a manner that said first terminus of said second piece of weldable material is substantially in alignment with and substantially abuts against said first terminus of said first piece of weldable material to form an abutment junction when said first terminus of said second piece of weldable material and said first terminus of said first piece of weldable material are fully inserted into said alignment device; and orbital welding means attached to said high precision alignment device and positioned for applying a weld to said abutment junction as said orbital welding means orbits said abutment junction;
fully inserting said first piece of weldable material into said alignment device;
fully inserting said second piece of weldable material into said alignment device until said first terminus of said first piece of weldable material and said first terminus of said second piece of weldable material form said abutment junction; and
welding said abutment function by supplying said orbital welding means with electrical power;
said clamping means comprising:
a first jaw, having a first end, a second end, and a first alignment zone having a first section inside surface and a second section inside surface that define an alignment gap;
a second jaw, having a first end, a second end, and a second alignment zone having an inside surface that defines a second alignment gap;
a pre-lock clamping jaw having a first end, a second end and a third alignment zone having an inner surface that defines a third-alignment gap, said third alignment gap being of substantially the same dimensions as said second alignment gap; said pre-lock clamping jaw being pivotably attached and oriented to said first jaw in such a manner that said inside surface of said third alignment zone and said first section inside surface of said first alignment zone cooperatively define a first section of an alignment conduit that is sized and shaped to snugly encircle and firmly secure said first terminus of said first piece of weldable material when said first end of said first jaw is at a first separation distance from said first end of said second jaw; said second jaw being pivotably attached to said first jaw and being oriented to said first jaw in such a manner that said second section inside surface of said first alignment zone and said inside surface of said second alignment zone cooperatively define a second section of said alignment conduit that is at least partially contiguous with said first section of said alignment conduit and that is sized and shaped to snugly encircle and firmly secure said first terminus of said second piece of weldable material when said first end of said first jaw is at a second, closer separation distance from said first end of said second jaw.

10. The method of claim 9 wherein said orbital welding means comprises a plurality of electrodes that extend into said alignment conduit.

11. The method of claim 10 wherein said alignment device further comprises centering means for placing said abutment junction in close proximity to said electrodes.

12. The method of claim 11 wherein said centering means comprises a centering pin retractably mounted to said alignment device and extending into said alignment conduit, said centering pin being positioned to blockingly engage said first terminus of said first piece of weldable material when said first end of said first jaw is at said first separation distance from said first end of said second jaw and said first terminus of said first piece of weldable material is fully inserted into said alignment device; said centering pin further being positioned to retract when said first terminus of said second piece of weldable material is fully inserted into said alignment device and abuts against said first terminus of said first piece of weldable material.

13. The method of claim 12 wherein said first terminus of said first piece of weldable material and said first terminus of said second piece of weldable material to be inserted in said precision alignment device are substantially cylindrically tubular; wherein the outside diameter of said first terminus of said first piece of weldable material is substantially equal to the outside diameter of said first terminus of said second piece of weldable material; and wherein the alignment tolerance at said abutment junction is less than to equal to 10%.

14. The method of claim 13, wherein said apparatus further comprises rotating gear means attached to said electrodes for operationally causing said electrodes to orbit said abutment junction.

15. The method of claim 14, wherein said apparatus further comprises closure means for moving said first end of said second jaw from said first separation distance from said first end of said first jaw to said second separation distance from said first end of said first jaw.

16. The method of claim 15, wherein said closure means comprises a pneumatic cylinder.

* * * * *